Figure 1:
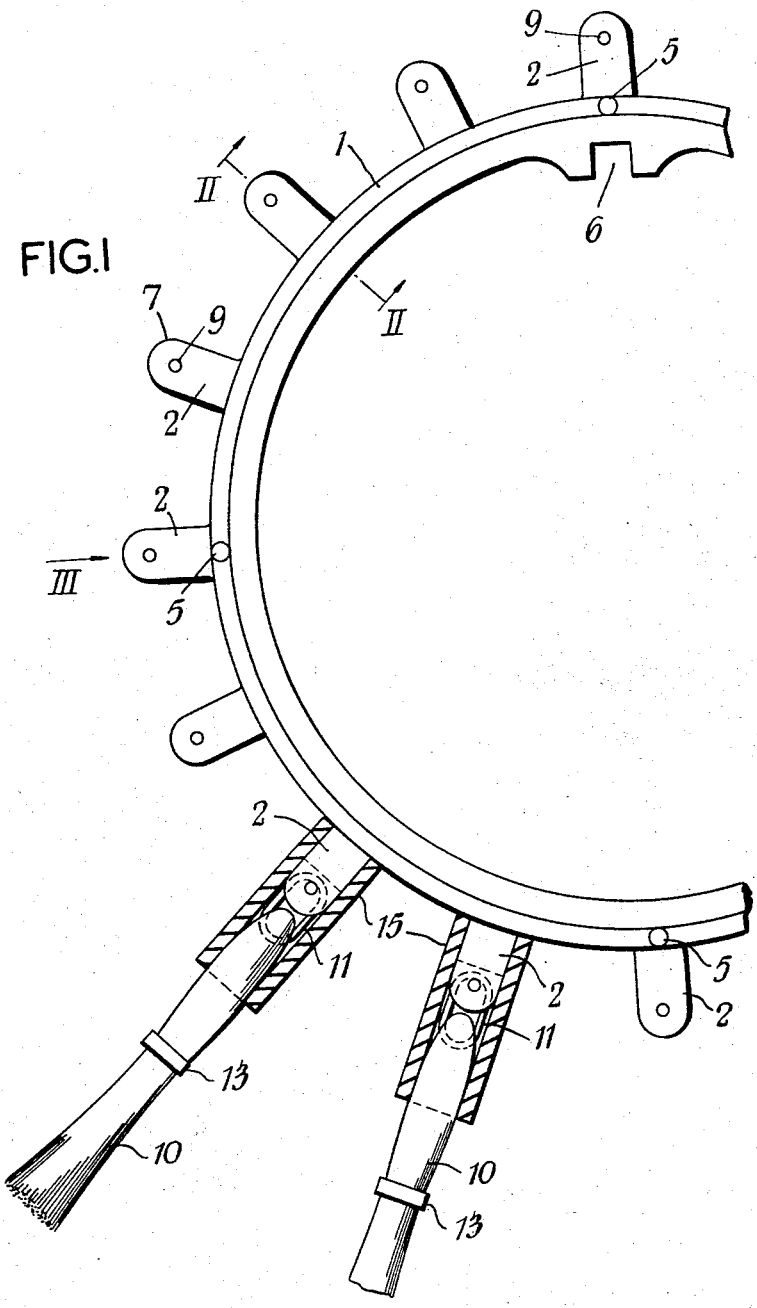

Oct. 18, 1966 L. R. GODFREY 3,278,966
ROTARY BRUSHES

Filed July 22, 1965 5 Sheets-Sheet 1

Inventor
Leonard Robert Godfrey
By Cushman, Darby & Cushman
Attorneys

Oct. 18, 1966      L. R. GODFREY      3,278,966
ROTARY BRUSHES

Filed July 22, 1965      5 Sheets-Sheet 2

Inventor
Leonard Robert Godfrey
By Cushman, Darby & Cushman
Attorneys

Oct. 18, 1966          L. R. GODFREY          3,278,966
                        ROTARY BRUSHES
Filed July 22, 1965                            5 Sheets-Sheet 3

Oct. 18, 1966   L. R. GODFREY   3,278,966
ROTARY BRUSHES
Filed July 22, 1965   5 Sheets-Sheet 4
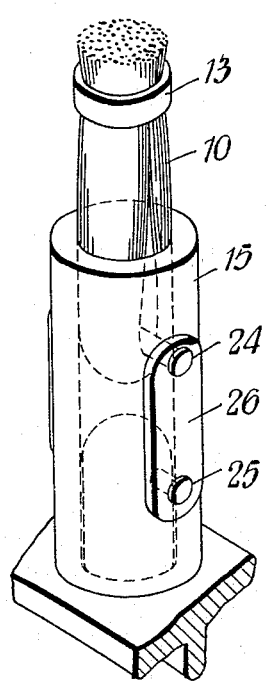
FIG.9
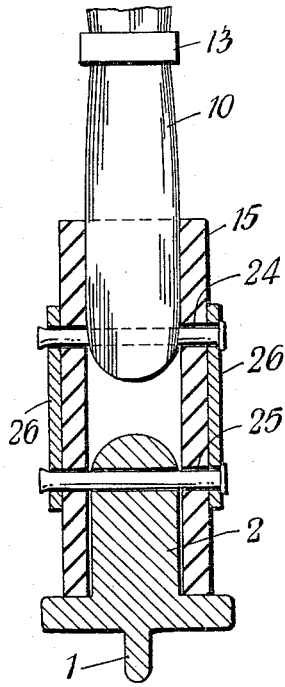
FIG.10
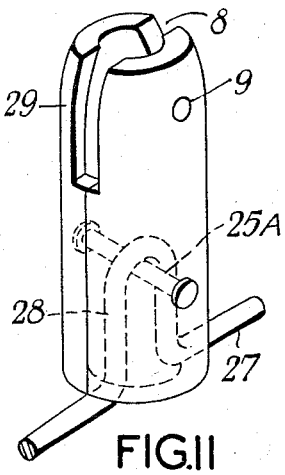
FIG.11
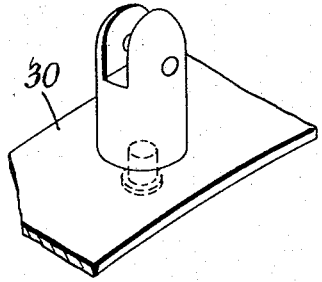
FIG.12
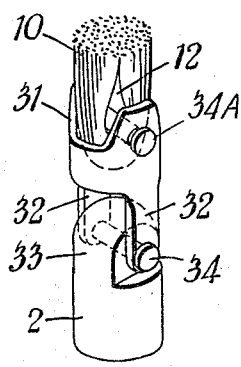
FIG.13
FIG.15
Inventor
Leonard Robert Godfrey
By Cushman, Darby & Cushman
Attorneys Oct. 18, 1966  L. R. GODFREY  3,278,966
ROTARY BRUSHES Filed July 22, 1965 5 Sheets-Sheet 5

United States Patent Office 3,278,966
Patented Oct. 18, 1966

3,278,966
ROTARY BRUSHES
Leonard Robert Godfrey, Chepstow, England, assignor to Dendix Brushes Limited, Chepstow, England, a British company
Filed July 22, 1965, Ser. No. 474,063
Claims priority, application Great Britain, July 24, 1964, 29,808/64
12 Claims. (Cl. 15—198)

This invention relates to rotary brushes, for example rotary brushes for sweepers designed for sweeping roads, aircraft runways and the like.

It is known, for example from British patent specification No. 814,113, to construct a rotary brush, for a sweeper, with brush filaments arranged in a large number of tufts which are mounted on a rotor and extend radially with respect to the axis of rotation of the rotor, each tuft being mounted in its own cup-shaped tuft holder, which is made of steel and is part of the rotor. Each tuft is pivotally mounted within its holder so that it can rock about its pivot axis, which is parallel to the axis of rotation of the rotor, when the brush is in use. Each tuft is made by making a bundle of steel filaments of equal lengths, putting a binding of thin iron wire around the bundle at its centre to hold the filaments together and folding the bundle in half to form the tuft, which has a bight at its root and has the two ends of each filament at its tip. A binding ring is placed around the tuft, about mid-way between its root and its tip. The root of the tuft is inserted in a rubber sleeve, which projects beyond the root of the tuft, and the root of the tuft and about half the rubber sleeve are inserted into one of the cup-shaped holders. A straight retaining wire, forming the pivot for the tuft, is passed through the root of the tuft and through diametrically opposite holes in the rubber sleeve and the tuft holder, the retaining wire lying in the bight of the tuft, parallel to the axis of rotation of the rotor, about 7 inches, for example, from the axis of rotation of the rotor and only a short distance from the mouth of the cup-shaped tuft holder. The same retaining wire passes in the same way through several tufts and the retaining wires have to withstand all the centrifugal force which acts on the tufts when the brush is used. The binding of thin iron wire around each tuft does not have to withstand any centrifugal force and is not strong enough to withstand all the centrifugal force which acts on the tuft when the rotor is rotated, at speeds of from 300 to 600 revolutions per minute, during use. Each rubber sleeve acts as a resilient restraining means, opposing movement of its tuft away from the position in which the axis of the tuft is radial with respect to the axis of rotation of the rotor and is coincident with the axis of its cup-shaped holder.

These brushes have proved very sucessful but it has been found that unless the filaments are of steel having a high tensile strength, which is expensive, they are very prone to break as a result of fatigue so that after only a short period of use the brush tufts must be replaced by new ones.

It is an object of the invention to provide a construction such that the tufts have an acceptably long life when made of inexpensive steel, of low tensile strength.

It has surprisingly been found that this object can be achieved by providing each tuft with a retaining member with respect to which the tuft can rock and by so mounting each retaining member that it can rock with respect to the rotor. Therefore, according to the invention, there is provided a rotary brush, wherein the brush filaments are arranged in tufts which are carried by a rotor and each of which is provided with a retaining member with respect to which the tuft can rock, the rocking being limited by resilient restraining means, characterised in that the retaining members can rock with respect to the rotor and this rocking is also limited by resilient restraining means.

According to a preferred form of the present invention, there is provided a rotary brush wherein brush filaments are arranged in tufts which are carried by a rotor, each tuft having its brush filaments in a bundle that is folded to form a bight at the root of the tuft, there being a retaining member which has a portion passing through the bight to form a pivot for the tuft, whereby the tuft can rock with respect to the retaining member, the retaining member being strong enough to withstand all the centrifugal force which would act on the tuft if the root of the tuft were 7 inches from the axis of rotation of the rotor and if the rotor were rotated at 600 revolutions per minute, the rocking of the tuft about the pivot being limited by resilient restraining means, characterised in that the retaining member comprises a substantially closed figure, for example substantially an oval or a rectangle, and has, in addition to the portion which passes through the bight of the tuft, another portion, on the side of the root of the tuft which is further from the tip of the tuft, through which a pin is inserted, the pin forming a pivot about which the retaining member can rock with respect to the rotor and being strong enough to withstand all the centrifugal force which would act on the tuft if the root of the tuft were 7 inches from the axis of rotation of the rotor and if the rotor were rotated at 600 revolutions per minute, and further characterised in that the rocking of the retaining member with respect to the rotor is also limited by resilient restraining means and in that the retaining member has no portion which passes through a bight in any other tuft.

If this form of brush is suitably constructed, its tufts, when worn, can be replaced by new tufts which differ from the tufts of the known brushes, described above.

Each retaining member in a brush according to the invention could comprise two separate substantially closed figures, one of which has a portion which passes through the bight in the tuft whilst the other affords the aforementioned aperture through which a pin is passed. Thus the retaining member could be in the form of a figure 8, with two completely closed figures, or substantially in the form of a capital S with two very nearly closed figures. In most cases the pin will be at least $\frac{1}{16}$ inch in diameter if it is of circular cross-section and will have an equivalent cross-sectional area if it is not of circular-section. Also the material of which the retaining member is made will in most cases be at least $\frac{1}{16}$ inch in diameter if it is of circular cross-section and will have an equivalent cross-sectional area if it is not of circular cross-section.

Figure 3:
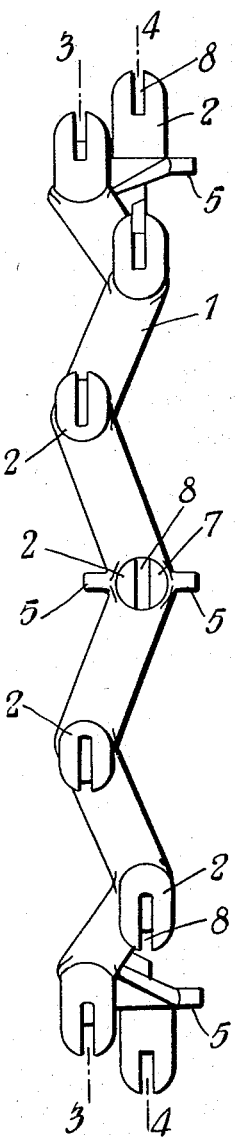
Figure 2:
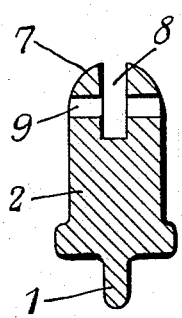
Figure 14:
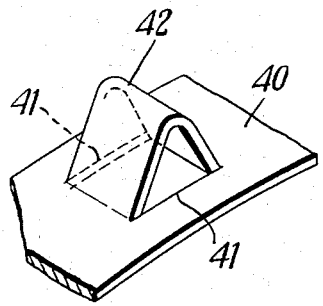
Figure 4:
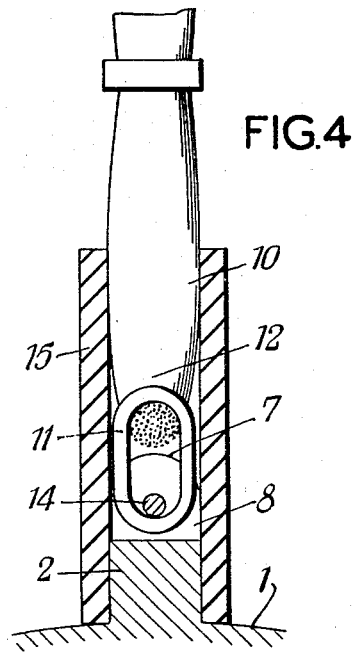
Figure 5:
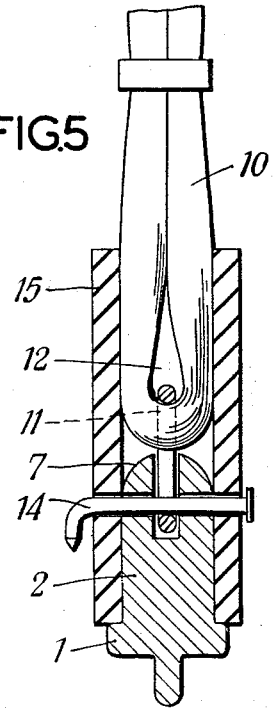
Figure 6:
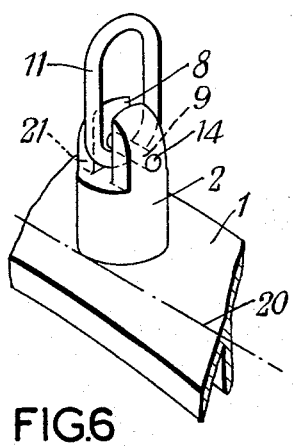
Figure 7:
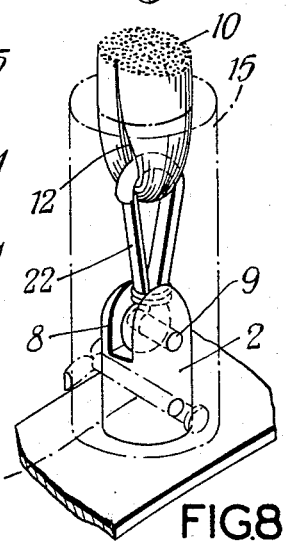
Figure 8:
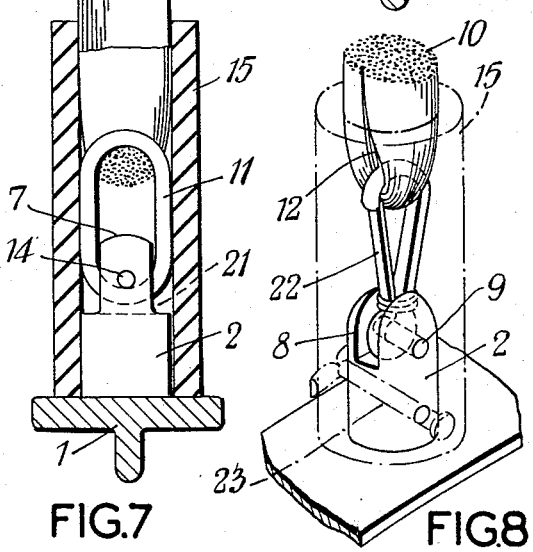
Figure 16:
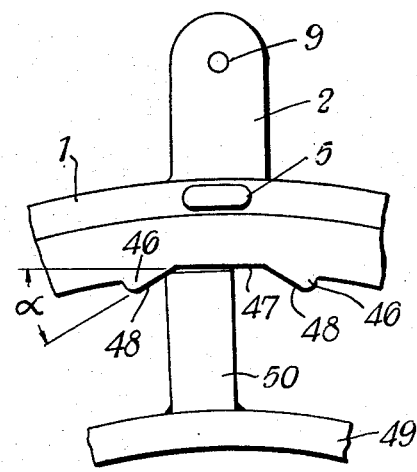
Figure 17:
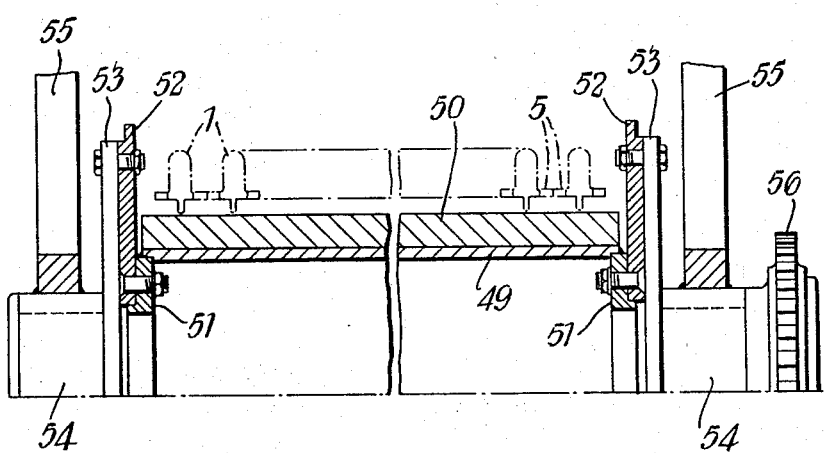

Examples in accordance with the invention are described below with reference to the accompanying drawings, in which:

FIGURE 1 is a side view of part of a rotary brush,

FIGURE 2 is a cross-sectional view of the same part, taken as indicated by the lines and arrows marked II—II in FIGURE 1, FIGURE 3 is a side view of the same part, taken as indicated by the arrow III in FIGURE 1, FIGURES 4 and 5 are two side views of a tuft of the brush and the means for securing it, FIGURES 6 and 7 are two views of a tuft of another form of brush and the means for securing the tuft, FIGURE 8 is a pictorial view of a tuft of another form of brush and the means for securing the tuft, FIGURES 9 and 10 are a pictorial view and a sectional view of a tuft of another form of brush and the means for securing the tuft, FIGURES 11 and 12 show parts of two further brushes, FIGURE 13 illustrates part of a further brush and shows a tuft and the means for securing it, FIGURE 14 shows part of a carrier for several tufts in a further form of rotary brush, FIGURE 15 shows how a tuft is secured to the carrier of FIGURE 14, FIGURE 16 shows part of a tubular carrier member and how it is coupled to a tuft-holding ring, and FIGURE 17 is a diagrammatic sectional view of the upper half of the entire rotor of a sweeper brush.

The brushes according to the drawings have an overall diameter of about 3 feet and are designed for sweeping snow from aircraft runways, but it is to be understood that the brushes can be used for other purposes and that larger and smaller brushes intended for the same and other purposes can be made in accordance with the invention.

The brush illustrated in FIGURES 1 to 5 has a rotor which includes several tuft-holding rings, one of which is shown in FIGURES 1 to 5 and is referenced 1, disposed in a row on a tubular carrier member (not shown) which passes through all the rings and is coaxial with them. The ring 1 is die-cast from aluminum and it is of T-shaped cross-section. Distributed at regular intervals around the ring 1 there are sixteen radially outwardly projecting solid posts 2 which are integral with the ring and support sixteen tufts of brush filaments. The ring 1 is so bent that the posts are in two rings 3 and 4, each of eight posts, such that, progressing around the periphery of the ring 1, there is first a post of the ring 3, then a post of the ring 4, then a post of the ring 3, and so on. At the root of each of four of the posts 2 there are two pins 5 which extend in opposite directions parallel to the axis of the brush. The ends of four pins 5 on the ring 1 abut the ends of four similar pins on the next ring in the row and in that way the rings such as the ring 1 are spaced apart along the tubular carrier member mentioned above. The rings are secured to the carrier member by means of a key which is welded to the carrier member and engages in a slot 6 in the ring 1 and similar slots in the other tuft-holding rings.

Each post 2 has a hemispherical outer end 7 and is formed with a recess 8 which extends from the end 7 about halfway along the post 2 and through the post from side to side. Each post is also formed with a circular hole 9 that passes diametrically through the post and at its center opens in to the recess 8.

Each tuft is made by passing a bundle of metal wires 10, of equal lengths, through a retaining member in the form of an elongated ring 11 and folding the bundle in half so as to form a bight 12 at the root of the tuft, with one end of the ring 11 passing through the bight, and placing a polyvinyl chloride ring 13 around the wires 10, nearer to the bight end of the tuft than to the tip of the tuft (the drawing does not show the whole of the length of any tuft). The end of the ring 11 that is not within the bight 12 provides an aperture, on the side of the root of the tuft which is further from the tip of the tuft, and this end of the ring 11 is inserted in the recess 8 in the post 2 and is held by a steel pin 14 (FIGURE 5) which has a diameter of 0.128 inch and passes through the aforementioned aperture and through the hole 9 in the post. The ring 11 is made of steel of circular cross-section having a diameter of 0.128 inch. A rubber sleeve 15 extends from the root of the post 2, past the bight 12 at the root of the tuft to a point about midway between the root of the tuft and the ring 13, this sleeve closely surrounding the post and the tuft. The pin 14 also passes through holes in the sleeve.

The drawing shows a head at one end of the pin and the other end of the pin bent sideways. Instead of this, the pin could simply be a short length of ordinary wire, both ends of which are bent sideways.

Referring now to FIGURES 6 and 7, in this construction each post 2 has a recess 8 and a hole 9 in it as before but these are in different positions, such that the pin 14 in the hole 9 is not parallel to the axis of rotation of the rotor but parallel to a tangent (20) to the ring 1 drawn at the base of the post 2. The sides of the post are cut away at the radially outermost end, as shown at 21, to facilitate rocking of the ring 11 with respect to the post 2. A sleeve 15 and a ring 13 are provided as before but are not shown in FIGURE 6. Not all the pin 14 is shown in FIGURE 6.

In the construction according to FIGURES 1 to 5, in use of the brush the tuft can rock with respect to the ring 11 in the plane which in FIGURE 4 is the plane of the paper and in the plane which in FIGURE 4 is vertical and perpendicular to the plane of the paper. This is also true of the construction according to FIGURES 6 and 7. In addition, in both constructions the ring 11 can rock with respect to the ring 1, and hence with respect to the rotor, in the plane which in FIGURE 4 is the plane of the paper and in the plane which in FIGURE 4 is vertical and perpendicular to the plane of the paper. In the construction according to FIGURES 1 to 5, one of these rocking movements is small, being limited by the ring 11 encountering the sides of the recess 8 but in the construction according to FIGURES 6 and 7 this restriction is removed by reason of the end of the post 2 being cut away as described above. In each construction, all the rocking movements are limited by the sleeve 15, which acts as a resilient restraining means, opposing movement of its tuft away from the position in which the axis of the tuft is radial with respect to the axis of rotation of the rotor and is coincident with the axis of the post 2.

The rings 11 could be oval instead of having straight sides or the rings could be replaced by rectangles.

In the construction shown in FIGURE 8, the recess 8 and the hole 9 in the post 2 can be in the positions shown in FIGURES 1 to 5 (as illustrated in FIGURE 8) or in the positions shown in FIGURES 6 and 7. Instead of a ring 11, there is employed as the retaining member for each tuft a clip 22 such as is used with dog-collars, one end being formed with a hole that receives the pin (not shown) which passes through the hole 9 and the other end being a closed figure and having a portion passing through the bight 12 of the tuft and holding the tuft. A rubber sleeve 15 surrounds the post 2, the clip 22 and the root of the tuft and is secured to the post 2 by a further pin 23. The tuft can rock with respect to the clip 22 in two different planes and the clip 22 can rock with respect to the rotor in two planes, these rocking movements being opposed by the rubber sleeve 15.

FIGURES 9 and 10 show a construction in which a retaining member constituted by a pin 24 passes through the bight in the tuft and through holes in the rubber sleeve 15 and the tuft can rock with respect to this pin. Another pin 25 passes through holes in the sleeve 15 and the post 2 and the pins 24 and 25 are interconnected at their ends by plate-like links 26. The pins 24 and 25 can be fixed with respect to the links 26 or they can be arranged to turn with respect to them. In both cases, the pin 24 can rock, about the axis of the pin 25, with respect to the rotor. Again, the rocking movements are opposed by the sleeve 15. The recesses 8 in the posts 2 are not required in this case.

FIGURE 11 shows an alternative to the die-cast ring 1. Here a metal wire 27 is fitted around the tubular support mentioned previously and is formed with outwardly projecting loops 28 on each of which is pressed a ferrule 29. A pin 25A passes through holes in the ferrule and through the loop 28, thereby retaining the ferrule in position. The ferrule is formed with a recess 8 and a hole 9 which receive a ring 11 and a pin 14 of an arrangement for anchoring a tuft, as in the example according to FIGURES 1 to 5. The recess 11 and the hole 9 could instead be in the positions indicated in FIGURES 6 and 7. Again there will be a rubber sleeve 15 fitted over the ferrule and surrounding the root of the tuft.

FIGURE 12 shows another alternative for the die-cast ring 1. A circular steel strip 30 has posts 2 riveted to it and is disposed around the tubular support (not shown). Tufts are held on the posts 2 in any of the ways described above. The posts could instead be welded to the strip 30.

FIGURE 13 shows a construction in which a tuft is held in a tubular holder 31 which has two legs 32 which are arranged astride a projection 33 at the outer end of the post 2 and are pivotally connected to the projection by means of a retaining member in the form of a pin 34. Another pin 34A passes through holes in the holder 31 and through the bight 12 of the tuft. The tuft can rock with respect to the holder 31 about the pin 34A and the holder 31 and the pin 34A can rock with respect to the rotor about the pin 34.

Again, a rubber sleeve will be disposed over the post 2 and the root of the tuft.

FIGURE 14 illustrates a steel band 40 the two ends of which have been joined to form a ring that fits upon the tubular support member forming part of the rotor of the brush. At intervals around the ring there are formed two parallel slits 41 and the material between each two of them is pressed outwardly to form an arch 42. As shown in FIGURE 15, a collar 43 is placed over the arch. A U-shaped retaining member 44 is employed, the ends of its arms being on opposite sides of the arch 42 and having holes through them through which passes a pin 45 which also passes under the arch. The member 44 is threaded through the bight 12 in the tuft, which is provided with a ring 13 as before, so that the base of the U lies in the bight. A rubber sleeve (not shown) closely surrounds the collar 43 and the radially innermost end of the tuft and the pin 45 passes through holes in the sleeve.

The sleeve opposes rocking of the tuft with respect to the member 44 and rocking of the link with respect to the rotor.

The illustrated methods of constructing and mounting the tufts have been devised with a view to permitting the use of wire with a lower tensile strength (100 to 110 tons per square inch) than has hitherto customarily been used in rotary brushes for sweeping roads and aircraft runways but if desired the tufts could be of steel of high tensile strength, in which case the advantage of longer life for the tufts will again be obtained.

FIGURE 16 shows part of a different form of tuft-holding ring 1 which has, at each of four positions equally spaced around it, two inwardly projecting lugs 46 between which there is a part 47 of the internal surface of the ring which is flat and tangential to the ring. The lugs 46 have surfaces 48 which are inclined by an angle α of about 30°, to the part 47 of the internal surface of the ring 1. FIGURE 16 also shows the aforementioned tubular carrier member, referenced 49, upon which all the rings 1 are mounted, this having welded to it four keys 50, each of which extends the whole length of the carrier member 49 and lies between two adjacent lugs 46 of each ring 1 and bears against the surface 48 of one of them when the rotor is driven. FIGURE 16 illustrates this for the case where the rotor is driven anticlockwise. The distance of the part 47 of the internal surface of the ring 1 from the axis of rotation of the rotor is greater than the internal radius of the ring at other parts of the ring and the distance between the tip of each key and the axis of rotation is greater than this radius but less than the distance of the part 47 from the axis of rotation, so that the ring 1 cannot be fitted on the carrier member 49 other than in the correct manner, with the key 50 lying between two adjacent lugs 46. In this construction, the pins 5 are of elongated cross-section, not circular.

FIGURE 17 diagrammatically shows the tuft-holding rings 1, constructed in accordance with any of the examples described above, mounted on the tubular carrier member 49. The tufts and the means for anchoring them to the rings 1 are not shown. Plates 51 are welded to opposite ends of the carrier member and to these plates there are bolted further plates 52 which are in turn bolted to plates 53. In practice each ring 1 which is at one end of the row of such rings will abut one of the plates 52 but this is not shown on the drawing. The plates 53 are secured to drums 54 which turn in bearings in non-rotatable brush carrier arms 55 of the sweeper, one of the drums 54 having a driving sprocket 56 secured to it whereby the rotor can be driven by a chain. When the bolts joining the plates 52 and 53 together are removed, the carrier member 49, the rings 1 and the plates 51 and 52 can be removed as a unit from the sweeper and when the bolts joining one of the plates 52 to one of the plates 51 are removed the rings 1 can be slid off the carrier member, to be replaced by new rings 1, with new tufts, if desired. When the tufts are worn, instead of replacing the rings 1 by new rings carrying new tufts, the worn tufts can be removed and replaced by new tufts. In the constructions according to FIGURES 1 to 7 and FIGURE 8, the rings 11 or the clips 22 are removed with the worn tufts and there are fitted on the brush new tufts which have previously been provided with their own rings 11 or clips 22.

The rings 11 and pins 14 of FIGURES 1 to 7, and the corresponding parts in the other figures which retain the tufts against being thrown off the rotor by centrifugal force, must withstand at least as much centrifugal force as would be exerted on a tuft if its root were 7 inches from the axis of rotation of the rotor and if its speed of rotation were 600 revolutions per minute, but the actual distance of the tuft root from the axis of rotation and the actual speed of rotation may be more or less than these values.

In the illustrated examples, the tufts are radial with respect to the axis of rotation of the rotor but they could lean towards one end of the rotor or each tuft could lie wholly in a plane which is normal to the axis of rotation of the rotor and could lie along a tangent to a circle the centre of which is on the axis of rotation.

I claim:

1. A rotary brush comprising:
   a rotor,
   brush filaments arranged in tufts,
   retaining members respectively associated with said tufts,
   said retaining members being in pivotal relationship with respect to said rotor,
   said brush filaments pivotally connected to said retaining members respectively, and
   resilient restraining means for respectively limiting the motion of said retaining members with respect to said rotor and of said tufts with respect to said retaining members.

2. A rotary brush as in claim 1 where each tuft comprises a folded bundle having a bight at the root thereof.

3. A rotary brush as in claim 2 where each of said support members includes a post having a recess extending from its tip toward its root and a pin extending through the recessed end of the post, one portion of said retaining members being respectively pivotally connected to said pins and the other portion thereof respectively passing through said bights.

4. A rotary brush as in claim 2 including a plurality of tubular holders for respectively receiving said tufts,
   and where each retaining member includes a pin passing through the bight in a tuft and through said tubular holder, and
   said tubular holders being pivotally connected to the rotor.

5. A rotary brush as in claim 2 where each retaining member is U-shaped,
   the base of each said U lying respectively in the bight of a tuft, and
   said retaining members being pivotally connected to the rotor.

6. A rotary brush as in claim 5 including a plurality of tuft holding rings disposed on said rotor, said rotor being coaxial thereto, each of said rings having outwardly extending arches, and pins respectively passing underneath said arches and connected to the arms of said U-shaped retaining members for pivotally connecting said retaining members to said rotor.

7. A rotary brush as in claim 1 including a plurality of tuft holding rings disposed on said rotor, said rotor being substantially coaxial with said rings, each of said rings having a plurality of outwardly projecting support members, and said retaining members being respectively pivotally connected to said support members.

8. A rotary brush as in claim 7 where each said ring has two rows of the support members where successive support members on each ring are in different rows.

9. A rotary brush as in claim 7 where each tuft has associated therewith a sleeve of resilient material, a first pin, a second pin, two connecting links, each said support member and the root of said tuft disposed within said sleeve, each said first pin passing through the bight in said tuft and through holes in said sleeve and interconnecting said two connecting links outside said sleeve, each said second pin passing through further holes in said sleeve and a hole through said support member and also interconnecting said connecting links, and each said first pin constituting a retaining member for the tuft and the second pin providing a pivotal connection between the retaining member and the rotor.

10. A rotary brush as in claim 1 wherein each said restraining means includes a sleeve of resilient material which surrounds the root of said tuft, the retaining member, and the support member.

11. A rotary brush as in claim 1 wherein each tuft comprises a folded bundle of filaments having a bight at the root thereof and each retaining member is a substantially closed figure having at least one aperture therein, a plurality of support members attached to said rotor and respectively associated with said tufts, each of said support members including means for respectively holding the retaining members, said holding means respectively passing through said apertures thereby respectively providing a pivotal connection of said retaining members with respect to said support members, and said retaining members respectively passing through said bights thereby providing a pivotal connection of said tufts respectively with respect to said retaining members.

12. A rotary brush as in claim 11 where each said retaining member has two separate substantially closed figures, one of which has a portion which passes through said bight and where said holding means passes through the other of said figures.

References Cited by the Examiner

UNITED STATES PATENTS

| | | | |
|---|---|---|---|
| 128,290 | 6/1872 | Beiderhase et al. | 15—198 |
| 134,582 | 1/1873 | Dimes | 15—179 X |
| 299,873 | 6/1884 | Stevens | 15—181 |
| 339,585 | 4/1886 | Root | 15—181 |
| 658,416 | 9/1900 | Yale | 15—198 |
| 717,851 | 1/1903 | Hirsch | 15—198 |

FOREIGN PATENTS

| | | |
|---|---|---|
| 1,352,797 | 1/1964 | France. |
| 814,113 | 5/1959 | Great Britain. |

CHARLES A. WILLMUTH, *Primary Examiner.*

PETER FELDMAN, *Assistant Examiner.*